US010683896B2

(12) United States Patent
Harich

(10) Patent No.: US 10,683,896 B2
(45) Date of Patent: Jun. 16, 2020

(54) BEARING CAGE OF A ROLLING-ELEMENT BEARING

(71) Applicant: Aktiebolaget SKF, Gothenburg (SE)

(72) Inventor: Roland Harich, Höchheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/288,239

(22) Filed: Feb. 28, 2019

(65) Prior Publication Data
US 2019/0285117 A1    Sep. 19, 2019

(30) Foreign Application Priority Data

Mar. 14, 2018 (DE) .................. 10 2018 203 914

(51) Int. Cl.
F16C 33/46 (2006.01)
F16C 33/54 (2006.01)
F16C 19/26 (2006.01)

(52) U.S. Cl.
CPC ........ F16C 33/4623 (2013.01); F16C 33/467 (2013.01); F16C 19/26 (2013.01); F16C 33/543 (2013.01); F16C 2240/40 (2013.01); F16C 2300/02 (2013.01)

(58) Field of Classification Search
CPC .............. F16C 33/4682; F16C 33/4623; F16C 33/4629; F16C 33/4635; F16C 33/467; F16C 33/543
See application file for complete search history.

(56) References Cited

U.S. PATENT DOCUMENTS 9,541,131 B2 * 1/2017 Claus .................... F16C 19/386
2012/0163748 A1 * 6/2012 Henneberger ...... F16C 33/4605
384/564
2016/0084311 A1 * 3/2016 Dittmar ............... F16C 33/4629
384/572
2018/0045299 A1 * 2/2018 Nonato de Paula ...... F02C 7/36

FOREIGN PATENT DOCUMENTS

EP          1233199 A2    8/2002

* cited by examiner

Primary Examiner — Phillip A Johnson
(74) Attorney, Agent, or Firm — Garcia-Zamor Intellectual Property Law, LLC; Ruy Garcia-Zamor; Bryan Peckjian

(57) ABSTRACT

A bearing cage includes a circumferential ring element and an axial bridge that meet in a connection region, and the connection region includes a recess formed such that a thickness of the ring element in the connection region is less than a thickness of the ring element outside the connection region and such that a thickness of the bridge in the connection region is not less than a thickness of the bridge outside the connection region.

15 Claims, 4 Drawing Sheets

BEARING CAGE OF A ROLLING-ELEMENT BEARING

CROSS-REFERENCE

This application claims priority to German patent application no. 102018203914.3 filed on Mar. 14, 2018, the contents of which are fully incorporated herein by reference.

TECHNOLOGICAL FIELD

The present disclosure is directed to a bearing cage for a rolling-element bearing, in particular for a tapered roller bearing, and to a rolling-element bearing, in particular a tapered roller bearing, including such a bearing cage.

BACKGROUND

Bearing cages are usually used in rolling-element bearings to support and guide the rolling elements of the rolling-element bearing, preferably in a uniformly-spaced manner. Such bearing cages can be manufactured from metal or plastic, and in the case of metal from a metal plate by punching and subsequent stamping. The cage itself usually consists of two ring elements axially offset from each other, which are connected to each other via bridges, so that pockets are formed between the ring elements and bridges, in which pockets the rolling elements are received. However, this also means that the rolling elements received in the pockets and the elements of the cage that form the pockets interact with each other, so that the bearing cage is subjected to heavy loads.

Here it has been found that in particular in the case of rolling-element bearings wherein the cages have a substantially angular shape, the structural loading of the cage in the corners, i.e., in the transition region between bridge and ring element, is particularly high. In order to reduce this load concentration in the corners of the pockets, it has been proposed to increase the radius of curvature in the corners of the pockets. However, with roller-shaped rolling elements of the rolling-element bearing this leads to interference with the edge reductions provided on the rollers, so that the radius of curvature in the corners of the pockets cannot be increased arbitrarily.

It has therefore been proposed in EP 1 233 199 A2 (family member of U.S. Pat. No. 6,599,019) to provide a recess in the region of the corner of the bearing cage on the bridge and on the ring element, via which recess the radius of curvature of the connection location can be increased without negatively influencing the edge reduction of the rolling element.

However, it is disadvantageous in this design that further weak points are introduced on the cage via the recesses, so that its structural load-bearing capacity is further compromised despite the increased radius of curvature.

SUMMARY

It is therefore an aspect of the present disclosure to provide a bearing cage of a rolling-element bearing, in particular for a tapered roller bearing, which bearing cage has a large structural load-bearing capacity.

In the following a bearing cage of a rolling-element bearing, in particular a tapered roller bearing, is presented that includes at least one first ring element extending in the circumferential direction of the bearing cage and at least one bridge extending essentially in the axial direction of the bearing cage. Here the bridge and the ring element are connected to each other in a connection region, wherein the at least one bridge has a particular bridge width in the circumferential direction of the bearing cage, and the ring element has a particular ring element thickness in the axial direction of the bearing cage.

Surprisingly the inventors have recognized that the structural weakening of the bearing cage from the prior art, including the recesses on the bridge and ring element, arises primarily due to the recess on the bridge. Therefore a bearing cage is disclosed wherein the ring element has a recess reducing the ring element thickness in the connection region between ring element and bridge, while the bridge has a consistent bridge width or even an increase of the bridge width. Due to the consistent bridge width or the increase of the bridge width the structural load-bearing capacity of the cage can be significantly increased, while at the same time a larger radius of curvature is possible in the transition between the bridge and the ring element. Nevertheless, due to the recess in the ring element an interference with the edge reduction of the roller to be held by the cage, or a jamming of the roller, can be avoided.

Here it is particularly advantageous if the recess on the ring element and the bridge widening in this region is provided not only on the first ring element of the bearing cage but also on the second ring element of the bearing cage, which is disposed axially offset with respect to the first ring element. As is known, the two ring elements are usually connected to the bridges, and together with the bridges form pockets for receiving the rolling elements. Due to the design of the recess on both ring elements the structural load-bearing capacity of the cage can be further increased, and a jamming of the roller in the pocket can be avoided.

The bearing cage itself can be manufactured one-piece, for example, from a metal plate; however it is also possible that the bearing cage is composed of individual elements.

According to a further advantageous exemplary embodiment, the recess on the first and/or second ring element defines a minimum ring element thickness $R_{min}$, and the bridge has a maximum bridge width $S_{max}$ at the location of the minimum ring element thickness. At the same time this means that the bridge in the direction of the minimum ring element thickness $R_{min}$ is preferably continuously distributed so that structural weaknesses that could arise, for example, via the design of the recess are compensated by the increasing of the bridge width.

According to a further advantageous exemplary embodiment the recess furthermore has a particular recess length x in the circumferential direction of the first and/or second ring element, and a recess depth y in the axial direction, wherein a ratio of recess length x to recess depth y falls in the range of 2 to 10. $2<x/y<10$. The inventors have recognized that with such a ratio both an optimal guiding of the rolling elements in the pocket, in particular an optimal abutment of the end surfaces of the rolling elements on the ring elements, and a low influencing or interference between rolling element and cage in the connecting region between bridge and ring element advantageously occurs. The running and guiding behavior of the bearing cage, as well as its structural integrity or load-bearing capacity can thereby also be improved.

In order to further increase the structural load-bearing capacity of the bearing cage, it is furthermore advantageous if the ratio of the minimum bridge width $S_{min}$, in particular a bridge width $S_{min}$ measured in the middle of the pocket, to a maximum bridge width $S_{max}$ in the connection region of the bridge to the first and/or second ring element falls between 0.5 and 0.9. $0.5 \leq S_{min}/S_{max} \leq 0.9$.

Alternatively or additionally the ratio between maximum ring element thickness $R_{max}$, in particular the ring element thickness measured in the center of the pocket, and minimum ring element thickness $R_{min}$, measured at the lowest point of the recess, can also fall between 1.05 and 1.4. $1.05 \leq R_{max}/R_{min} \leq 1.4$. A bearing cage having at least one of the above-mentioned ratios has a particularly good structural load-bearing capacity.

Furthermore it is advantageous if the enlargement of the bridge in the connecting region between bridge and first and/or second ring element is continuous and takes place along a curvature having a radius r. A particularly good transition between bridge and ring element can thereby be provided.

Furthermore the bearing cage usually has a radial inner side and a radial outer side. Here the inventors have recognized that when the enlargement of the bridge follows a curvature having the radius r, the radius of curvature $r_a$ on the radially outer side can be greater than the radius of curvature $r_i$ on the radially inner side, in particular when the cage is manufactured by stamping and punching. Here in particular the radius $r_a$ on the radially outer side is defined by using a first tool, in particular a punching tool, and the radius $r_i$ on the radially inner side by using a second tool, in particular a stamping tool. Due to this different design of the radii on the outer side and on the inner side the structural integrity of the cage can also be further improved.

According to a further advantageous exemplary embodiment the bearing cage is manufactured from a metal plate.

Here it is particularly advantageous if the metal plate has a particular metal-plate thickness wherein the radius r of the curvature along which the bridge enlarges is dependent on the metal-plate thickness t, so that the radius falls in the following defined range:

$$0.2 \cdot t + 0.5 \leq r \leq 0.2 \cdot t + 0.9$$

wherein t represents a thickness, measured in units of a dimension and wherein r represents a radius, measured in units of a dimension.

A further advantage of the bearing cage according to the invention lies in that due to the design described above the structural load-bearing capacity of the bearing cage can be increased such that even a reduction of the metal-plate thickness is possible. This in turn leads to a reduction of the material consumption and thus a cost reduction.

A further aspect relates to a rolling-element bearing, in particular a tapered roller bearing, including at least one inner ring, one outer ring, and roller-shaped rolling elements disposed therebetween, wherein the rolling elements are received in a bearing cage as described above.

Furthermore it is advantageous if the roller-shaped rolling elements include a running surface by which they roll on the inner and outer ring, and they are at least partially guided by the bridge of the bearing cage, and include a first and a second end surface, wherein the first end surface is associated with the first ring element of the bearing cage and the second end surface with the second ring element. It is particularly advantageous here if an edge reduction is provided in a transition region between first and/or second end surface and the running surface so that the first and or second end surface is offset radially inward from the running surface by an edge reduction value k, and in the transition region between running surface and first end surface or second end surface the running surface is shorter by the edge reduction value k than the total longitudinal extension of the roller between first and second end surface. The edge reduction is preferably symmetrical; however it is also possible that edge reduction values differ between running surface and end surface and/or also at the first or second end side.

Furthermore it is advantageous if the recess depth y of the recess on the bearing cage is established by the edge reduction value k, wherein a ratio of edge reduction value k to the recess depth y preferably falls in the range between 1.2 and 1.8, $1.2 \leq k/y \leq 1.8$. It can thereby be ensured that the edge reduction of the roller-shaped rolling element and the recess do not adversely affect or interfere with each other.

Furthermore the inventors have found that with a continuous bridge widening in the connecting region between bridge and ring element, it is advantageous if the radius of curvature r and the edge reduction value are in a particular ratio to each other wherein the following is true of the radius r:

$$1.1 \cdot k \leq r \leq 1.4 \cdot k$$

If the rolling-element bearing includes a bearing cage wherein the curvature of the bridge widening in the connecting region between bridge and ring element on the outer side of the cage differs from that on the inner side of the cage, then it is also advantageous if the following is true of the radius of the outer side:

$$1.1 \cdot k \leq r_a \leq 1.4 \cdot k$$

And/or the following is true for the inner radius:

$$0.8 k \leq r_i \leq 1.0 \cdot k$$

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
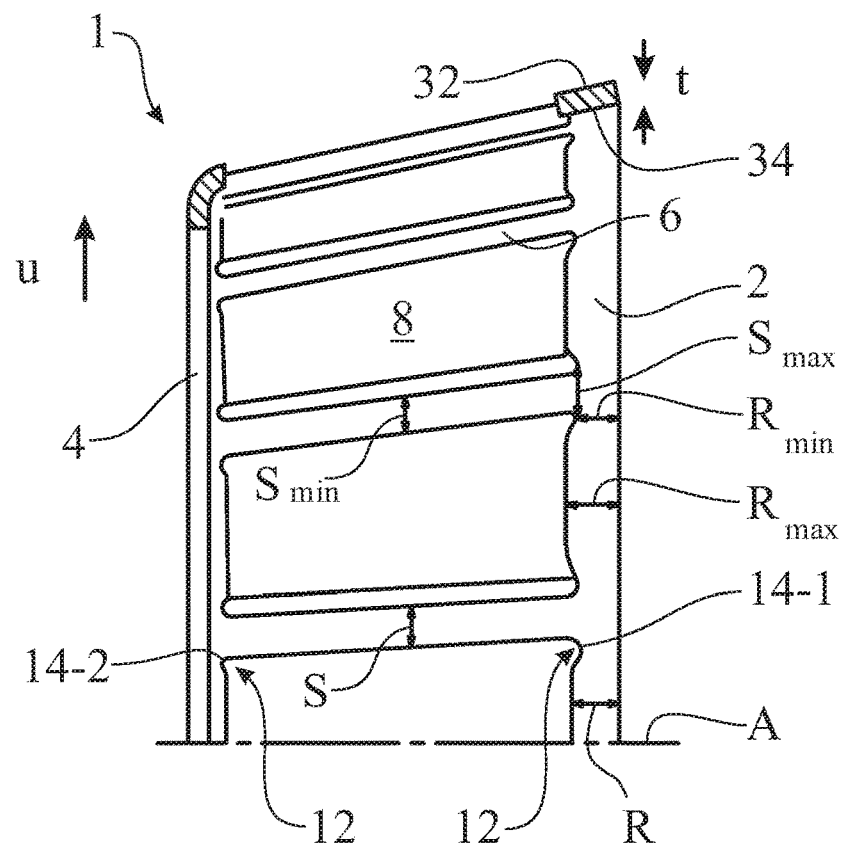
FIG. 1 presents a schematic sectional view through a first exemplary embodiment of a bearing cage according to the disclosure.
Figure 2:
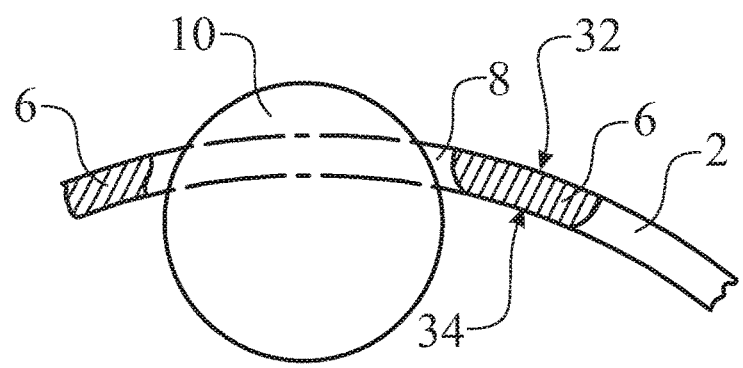
FIG. 2 presents a schematic sectional view through a bearing cage that includes a roller received therein.

A sectional view through a bearing cage 1 of a tapered roller bearing, including a first ring element 2 and a second ring element 4 that are connected to each other by a plurality of bridges 6 is illustrated in FIG. 1. Pockets 8 are thereby formed between first ring element 2, second ring element 4, and the bridges 6, in which pockets roller-shaped rolling elements (shown in FIGS. 2 and 5) are receivable. The receiving of a rolling element 10 is depicted in FIG. 2, wherein in addition the ring element 2 and, in sectional view, the bridges 6 are visible. As can further be seen in FIG. 2, the rolling element 10 is received in the pocket 8. Even though a tapered roller bearing is depicted in the figures, other rolling-element bearings can be equipped with a cage that is similarly equipped in the transition region between bridge and ring. The bearing cage itself is usually manufactured from a metal plate or plastic.

Furthermore, as can be seen in the sectional view of FIG. 1 the bearing cage 1 has a metal-plate thickness t. Due to the novel design of the bearing cage 1 described below this metal-plate thickness t can be reduced without the structural load-bearing capacity of the bearing cage 1 being impaired.

For this purpose the bearing cage 1 further includes a recess 14-1, 14-2 in a connection region 12 between the bridge 6 and the first and/or second ring element 2; 4. This recess 14-1, 14-2 is configured here such that in this region a reduction of the ring element thickness R is effected specifically to a minimum ring element thickness $R_{min}$, but an enlargement of the bridge thickness S is effected specifically to a maximum bridge width $S_{max}$. Here a ring element thickness in the axial direction is measured with respect to an axis of rotation A of the bearing cage 1, while a bridge width is measured in the circumferential direction U of the bearing cage. As can further be seen in FIG. 1 the recess 14-1, 14-2 is configured such that a maximum bridge widening $S_{max}$ is formed at the location at which the ring element thickness $R_{min}$ is minimal.

Here it has proven particularly advantageous if a ratio between maximum ring element thickness $R_{max}$ and minimum ring element thickness $R_{min}$ falls in the range between 1.05 and 1.4:

$$1.05 \leq R_{max}/R_{min} \leq 1.4$$

Furthermore it is advantageous if the ratio of the minimum bridge width $S_{min}$ to the maximum bridge width $S_{max}$ falls between 0.5 and 0.9:

$$0.5 \leq S_{min}/S_{max} \leq 0.9$$

In the depicted bearing cage of a tapered roller bearing, the minimum bridge width $S_{min}$ and the maximum ring element thickness $R_{max}$ are preferably measured in the center of the pocket 8. With cages of other rolling-element bearings the values can be determined at other points.

Since in the transition region between the bridge 6 and the first or second ring element 2; 4 no tapering of the bridge width but rather an enlargement of the bridge width occurs, the weakening of the bearing cage 1 that occurs due to the introduction of the recess into the ring element thickness can be compensated for.

Figure 3:
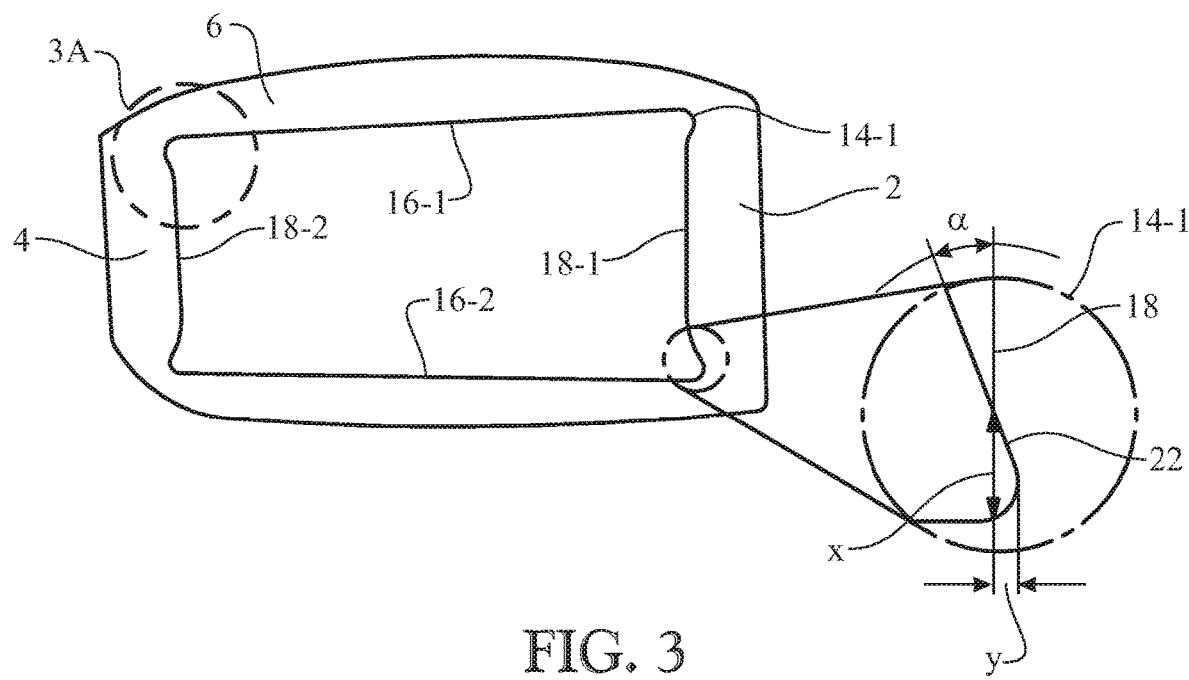
FIG. 3 presents a detailed view of a pocket of the cage of FIG. 1.
Figure 4:
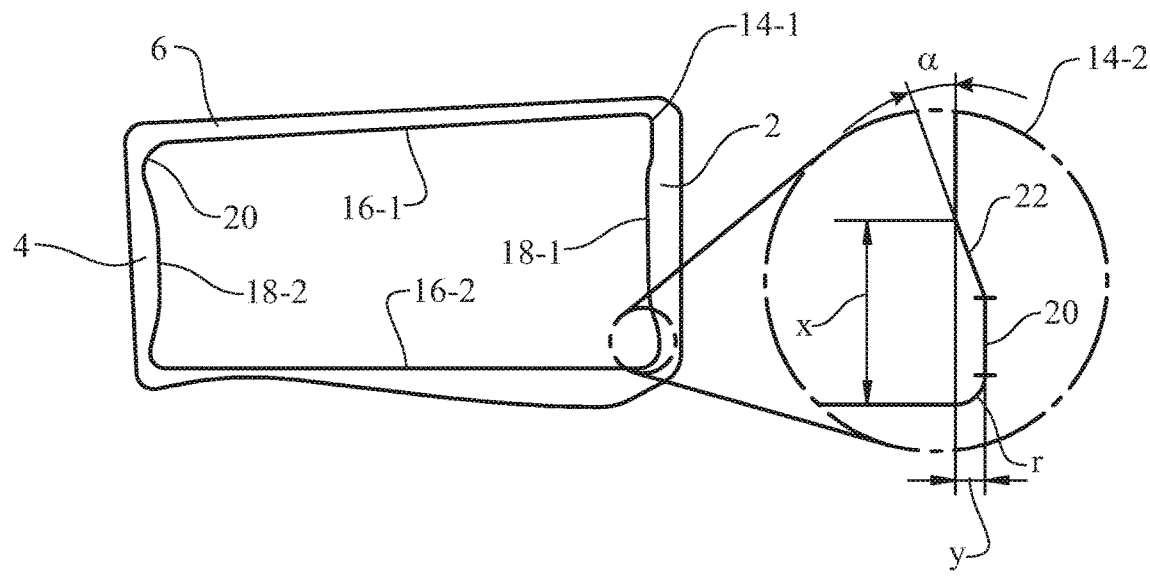
FIG. 4 presents a detailed view of a pocket of a second exemplary embodiment of a cage according to the present disclosure.

Two different designs for the pocket shape 8 are shown respectively in FIGS. 3 and 4. Only one pocket is respectively depicted here. The bridge and ring element are depicted only in section and each show their inner edges 18-1, 18-2 (ring element) or 16-1, 16-2 (bridges) so that no ring element thickness or bridge width is visible here. Furthermore, FIGS. 3 and 4 show in particular in the enlarged cutouts that the recess 14-1 or 14-2 respectively has a certain recess length x in the circumferential direction and a recess depth y. It has further proven here that is advantageous if the ratio between recess length x and recess depth y falls in the range from 2 to 10:

$$2 \leq x/y \leq 10$$

In order to provide a particularly large ratio between recess length x and recess depth y, as further depicted in FIG. 4 the recess 14 can include a recess base 20 that extends essentially parallel to the inner edge 18 of the ring element 2, 4. Due to this straight-extending recess base 20 the recess length x can be increased in order to adapt the bearing cage to the requirements of the rolling-element bearing. Such an enlargement of the recess length x is advantageous in particular with larger metal-plate thicknesses t. Furthermore the enlarged cutouts show that the transition from the recess 14 to the inner edge 18 of the pocket is effected via an essentially straight section 22 that is angled at an angle α with respect to the inner edge 18. The angle α preferably falls in the range of 10°-25°.

Furthermore it can be seen in FIGS. 3 and 4 that the transition from minimum ring element thickness $R_{min}$ to maximum bridge width $S_{max}$ occurs continuously and along a curvature having radius r.

Here the inventors have further recognized that a particularly stable cage can be obtained if the metal-plate thickness t is set in relation to the radius r such that it is true that:

$$0.2 \cdot t + 0.5 \leq r \leq 0.2 \cdot t + 0.9$$

wherein t represents a thickness, measured in units of a dimension and wherein r represents a radius, measured in units of a dimension.

Figure 5A:
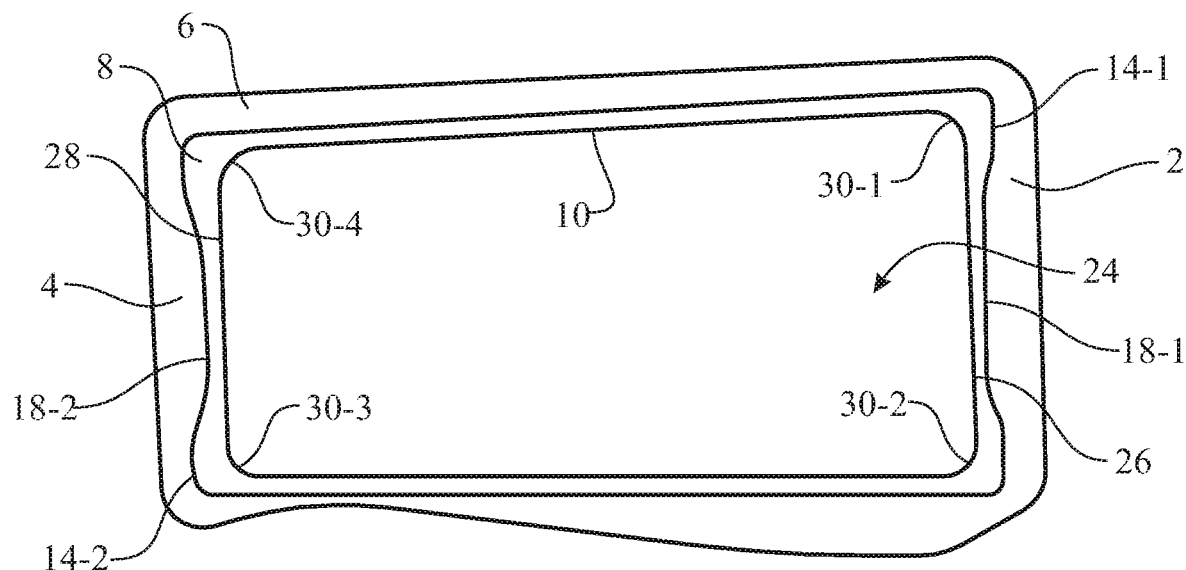
FIGS. 5A and 5B are detail views of the pocket depicted in FIG. 4 with a roller received therein.
Figure 5B:
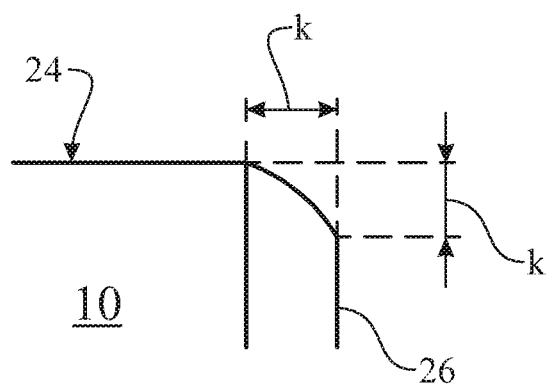

Furthermore FIG. 5A shows an exemplary embodiment of the cage as in FIG. 4 with roller 10 received therein. As can further be seen in FIGS. 5A and 5B, the roller 10 includes a running surface 24, via which the roller 10 rolls along on the inner or outer ring of the rolling-element bearing (not depicted) and is guided by the bridge 6. Furthermore the roller 10 includes a first end surface 26 that is associated with the first ring element 2, and a second end surface 28 that is associated with the second ring element 4. Both end surfaces 26, 28 interact with the inner side 18 of the ring elements 2, 4. As can further be seen from FIGS. 5A and 5B, each roller 10 includes an edge reduction 30-1, 30-2, 30-3, 30-4 at the transition region between running surface 24 and the end surfaces 26, 28. One of these edge reductions 30-1 is depicted enlarged in FIG. 5. Here the running surface or the first or second end surface is respectively reduced by an edge reduction value k. As depicted, the edge reduction is preferably symmetrical.

The edge reduction value k in turn determines the recess depth y, wherein a ratio of edge reduction value k to recess depth y falls in the range between 1.2 and 1.8.

$$1.2 \leq k/y \leq 1.8$$

It can be ensured by this relationship that an optimal balance is achieved between the edge reduction k and the recess y, so that no interference arises between roller 10 and cage 1. It can thereby also be ensured that a sufficiently large curvature angle r or an enlargement of the bridge widths S can be effected without the roller 10 jamming in the cage 1. For the ratio between edge reduction value and radius the following relationships have been recognized as advantageous:

$$1.1 \cdot k \leq r \leq 1.4 \cdot k$$

Figure 3A:
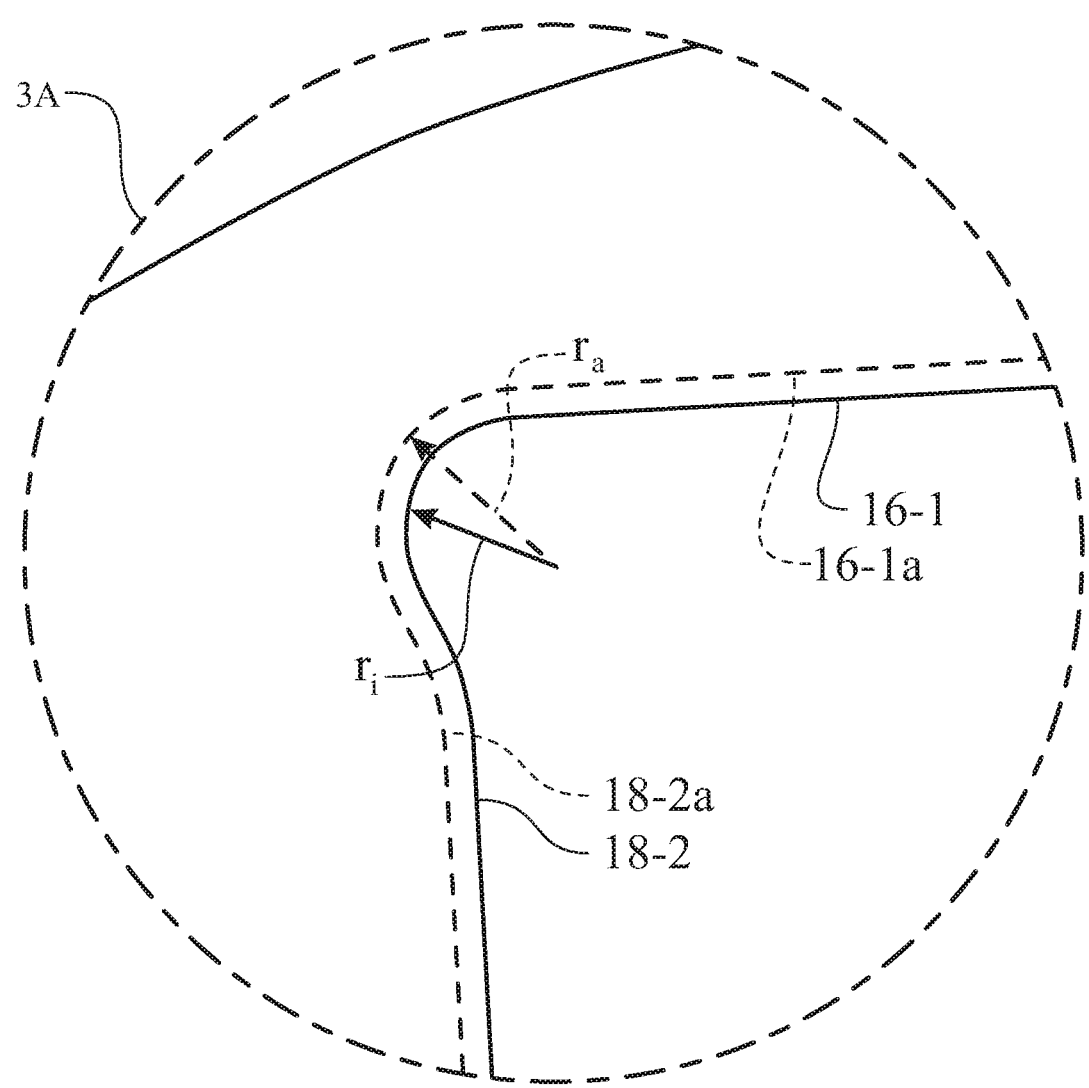
FIG. 3a presents a detailed view of a radius of curvature of a recess of the pocket of the cage of FIG. 1, the detail being identified as detail section 3A of FIG. 3.

Furthermore it can be advantageous if the cage has a different radius on its radially outer surface 32 (see FIG. 1)

than on its radially inner surface 34 (see FIG. 1). These different radii $r_i$, $r_a$ are identified in an enlarged section of FIG. 3 illustrated in FIG. 3A. However, it is advantageous if the outer radius $r_a$ of the curvature is greater than the inner radius $r_i$ of the curvature, and the outer radius $r_a$ is usually provided by a first tool and the inner radius $r_i$ is provided by a second tool. More specifically, the bearing cage 1 has a radially inner side 34 and a radially outer side 32, wherein a radius of curvature $r_a$ located on the radially outer side 32 is greater than a radius of curvature $r_i$, located on the radially inner side 34 and wherein the radius of curvature $r_a$ located on the radially outer side 32 is formed by an application of a punching tool and the radius of curvature $r_a$ located on the radially inner side 34 is formed by an application of a second stamping tool. Thus it is advantageous; for example, if the outer radius $r_a$ is provided by punching of a metal plate, while the inner radius $r_i$ is formed by a subsequent stamping treatment of the bearing cage. The inner or outer radius $r_a$, $r_i$ are also preferably determined via the edge reduction value k of the roller 10 to be received, wherein in particular the following relationships have proven as advantageous:

$$1.1 \leq r_a \leq 1.4 \cdot k \text{ or } 0.8 \cdot k \leq r_i \leq 1.0 \cdot k$$

Overall, using the disclosed bearing cage design a bearing cage can be provided whose structural load capacity is increased such that even a reduction of the metal-plate thickness t of the cage 1 is possible with identical load values compared to a standard design. In addition, interference and thus jamming of the rollers 10 in the cage pockets 8 can be reliably prevented despite increased radius of curvature r between bridge 6 and ring element 2, 4. At the same time, by adapting the recess length x and recess depth y the cage 1 can be optimally adapted to the desired properties.

REFERENCE NUMBER LIST

Ref No. Description
1 Bearing cage
2 First ring element
4 Second ring element
6 Bridge
8 Pocket
10 Roller
12 Connection region
14-1 Recess
14-2 Recess
16-1 Bridge inner edge (bearing cage inner surface)
16-1a Bridge inner edge (bearing cage outer surface)
16-2 Bridge inner edge
18 Ring element inner edge
18-1 Ring element inner edge (bearing cage inner surface)
18-2 Ring element inner edge
18-2a Ring element inner edge (bearing cage outer surface)
20 Recess base
22 Transition between recess and inner edge of the ring element
24 Running surface of the roller
26, 28 End surface of the roller
30-1 Edge reduction
30-2 Edge reduction
30-3 Edge reduction
30-4 Edge reduction
32 Radially outer side/edge
34 Radially inner side
α angle
r Radius of curvature
$r_a$ radius of curvature (bearing cage outer surface)
$r_i$ radius of curvature (bearing cage inner surface)
k Edge reduction value
t Metal-plate thickness
S Bridge width
$S_{min}$ Bridge width (minimum)
$S_{max}$ Bridge width (maximum)
R Ring element thickness
$R_{min}$ Ring element thickness (minimum)
$R_{max}$ Ring element thickness (maximum)
x Recess length
y Recess depth
u Circumferential direction
A Axial direction

What is claimed is:

1. A bearing cage configured for use in a rolling-element bearing, the bearing cage comprising:
a first ring element extending in a circumferential direction of the bearing cage, and
a first bridge extending substantially in an axial direction of the bearing cage,
wherein the first bridge is connected to the first ring element at a first connection region,
wherein the first bridge has a first bridge first width in the circumferential direction of the bearing cage at a location outside the first connection region and a first bridge second width in the circumferential direction of the bearing at a location in the first connection region,
wherein the first ring element has a first ring element first thickness in the axial direction of the bearing cage at a location outside the first connection region and a first ring element second thickness in the axial direction of the bearing cage at a location in the first connection region, and
wherein the first connection region includes a recess, the recess being located in the first connection region relative to the first ring element and the first bridge such that the first ring element second thickness is less than the first ring element first thickness and such that the first bridge second width is not less than the first bridge first width.

2. The bearing cage according to claim 1,
including a second ring element and a second bridge, the first bridge and the second bridge extending from the first ring element to the second element and defining a pocket configured to receive a rolling element, the first bridge being connected to the second ring element at a second connection region,
wherein the first bridge has a first bridge third width in the circumferential direction of the bearing cage at a location in the second connection region,
wherein the second ring element has a second ring element first thickness in the axial direction of the bearing cage at a location outside the second connection region and a second ring element second thickness in the axial direction of the bearing cage at a location in the second connection region,
wherein the second ring element second thickness is less than the second ring element first thickness and the first bridge third width is not less than the first bridge first width.

3. The bearing cage according to claim 1,
wherein the first ring element has a minimum ring element thickness at a recess location in the first connection region and wherein the first bridge has a maximum bridge width at the recess location.

4. The bearing cage according to claim 1, wherein the recess of the first connection region has a circumferential recess length and an axial recess depth, and wherein a ratio of the recess length to the recess depth is from 2 to 10.

5. The bearing cage according to claim 4, wherein the recess length extends over a substantially straight-extending recess base.

6. The bearing cage according to claim 1, wherein a ratio of a minimum bridge width outside the first connection region, to a maximum bridge width in the first connection region is from 0.5 to 0.9.

7. The bearing cage according to claim 1, wherein the first ring element has a first ring element maximum thickness at the location outside the first connection region and a first ring element minimum thickness at the location in the first connection region and wherein a ratio between the first ring element maximum thickness and the first ring element minimum thickness is from 1.05 to 1.4.

8. The bearing cage according to claim 1, wherein an enlargement of the bridge width in the first connection region is continuous and occurs along a curvature having a radius.

9. The bearing cage according to claim 8,
wherein the bearing cage has a radially inner side and a radially outer side,
wherein a radius of curvature located on the radially outer side is greater than a radius of curvature located on the radially inner side, and
wherein the radius of curvature located on the radially outer side is formed by an application of a punching tool and the radius of curvature located on the radially inner side is formed by an application of a second stamping tool.

10. The bearing cage according to claim 8,
wherein the bearing cage is manufactured from a metal plate having a metal-plate thickness (t), and wherein a radius of the curvature (r) of a radially outer side of the bearing cage is dependent on the metal plate thickness, and wherein the radius of curvature (r) satisfies the inequality: $0.2 \cdot t + 0.5 \leq r \leq 0.2 \cdot t + 0.9$, wherein t and r are in measurements of a distance.

11. The bearing cage according to claim 1, wherein the bearing cage is manufactured from a metal plate.

12. A rolling-element bearing comprising:
at least one inner ring,
one outer ring, and
roller elements disposed between the at least one inner ring and the outer ring,
wherein the rolling elements are received in the bearing cage according to claim 1.

13. A rolling-element bearing according to claim 12,
wherein the roller elements have a running surface configured to roll on the inner ring and the outer ring and to at least partially contact the first bridge, and a first and a second end surface,
wherein the first end surface faces the first ring element and the second end surface faces the second ring element,
wherein at a transition region between first end surface and the running surface an edge reduction is provided so that the first end surface is offset radially inward by an edge reduction value (k) of the running surface, and such that the running surface is shorter by the edge reduction value (k) than a total longitudinal extension of the roller elements between first and second end surface,
wherein a recess depth of the recess on the bearing cage is defined by the edge reduction value (k), and
wherein a ratio of the edge reduction value (k) to a recess depth is from 1.2 to 1.8.

14. The rolling-element bearing according to claim 13,
wherein the cage is formed from a metal plate,
wherein a curvature of the first bridge enlargement in the first connection region has a radius (r) defined by the edge reduction value (k), and wherein the inequality: $1.1 \cdot k \leq r \leq 1.4 \cdot k$ is satisfied.

15. A bearing cage configured for use in a rolling-element bearing, the bearing cage comprising:
a ring element extending in a circumferential direction of the bearing cage,
a bridge extending substantially in an axial direction of the bearing cage,
a recess extending into the ring element at a junction of the ring element and the bridge,
wherein the recess does not extend into the bridge,
wherein a width of a first portion of the bridge at the recess is greater than a width of a second portion the bridge at a location axially spaced from the recess.

* * * * *